United States Patent [19]

Ikeda

[11] Patent Number: 5,488,564
[45] Date of Patent: Jan. 30, 1996

[54] NUMERICAL CONTROL UNIT WITH SCHEDULE SKIP CAPABILITY

[75] Inventor: Mutsumi Ikeda, Aichi, Japan

[73] Assignee: Mitsubishi Denki Kabushiki Kaisha, Tokyo, Japan

[21] Appl. No.: 899,329

[22] Filed: Jun. 16, 1992

[30] Foreign Application Priority Data

Jun. 17, 1991 [JP] Japan ..................................... 3-144636

[51] Int. Cl.⁶ .................................................. G06F 17/00
[52] U.S. Cl. ...................... 364/474.16; 364/191; 364/140
[58] Field of Search .......................... 364/474.11, 474.15, 364/474.16, 192, 140, 141, 142, 474.21, 474.24, 191; 318/567, 568.23

[56] References Cited

U.S. PATENT DOCUMENTS

| | | | |
|---|---|---|---|
| 4,473,883 | 9/1984 | Yoshida | 364/474.11 X |
| 4,616,322 | 10/1986 | Niwa et al. | 364/474.21 |
| 4,736,325 | 4/1988 | Nagae et al. | 364/474.02 |
| 4,794,514 | 12/1988 | Hideaki et al. | 364/192 |
| 4,835,730 | 5/1989 | Shimano et al. | 364/513 |
| 4,841,431 | 6/1989 | Takagi et al. | 364/474.11 |
| 4,858,102 | 8/1989 | Lovrenich | 364/474.16 |
| 4,994,980 | 2/1991 | Lee et al. | 364/474.15 |
| 5,070,476 | 12/1991 | Fujiwara | 364/140 X |
| 5,093,772 | 3/1992 | Senda et al. | 364/140 |
| 5,214,588 | 5/1993 | Kaneko et al. | 364/468 |

FOREIGN PATENT DOCUMENTS

1200409 8/1989 Japan .

*Primary Examiner*—Roy N. Envall, Jr.
*Assistant Examiner*—Brian C. Oakes
*Attorney, Agent, or Firm*—Sughrue, Mion, Zinn, Macpeak & Seas; Richard C. Turner

[57] ABSTRACT

A numerical control (NC) machine tool is controlled by a machining program, which gives the machine tool instructions with respect to the machining of a locus on a workpiece, machining conditions and the like, and responds to a variety of input data which may be stored or registered in a manner that comprises a schedule run, and includes a schedule skip capability. The schedule skipping capability permits portions of the scheduled run to be skipped at the occurrence of an event, such as an alarm, but allows machining to be continued without stopping the schedule run. The scheduled run may skip to a new program, to commands for changing tools, pallets, workpieces and the like, or to conduct a measurement schedule run in association with the machining run. The memory for storing a measurement schedule corresponding to a machining schedule allows any measurement schedule to be utilized without impairing machining productivity greatly. The memory is capable of registering two or more schedule elements as one group, thereby allowing a complicated schedule, such as the repeated machining of multiple sets of workpiece machining, to be made out easily with a small-capacity memory. A clock and the memory for storing run start time corresponding to a schedule allow run start time of day and run interval time to be set for unattended operation. Schedule data may be displayed for schedule specification and editing.

21 Claims, 19 Drawing Sheets

FIG. 7

| SCHEDULE NO. | RUN / MAIN MACH. NAME | QTY. | NO. MACHINED | START TIME | SKIP TYPE | MEAS. NAME |
|---|---|---|---|---|---|---|
| 01 | PART AB | 2 | 2 | 18:00:00 | | |
| 02 | PART C | 100 | 58 | 00:00:40 | INC | PART C MEAS. |
| 03 | | | | | | |
| 04 | | | | | | |
| 05 | | | | | | |
| 06 | | | | | | |
| 07 | | | | | | |
| 08 | | | | | | |
| 09 | | | | | | |
| 10 | | | | | | |

RUN COMP.
RUNNING

[OPEN] [CLOSE]

FIG. 8

| SCHEDULE RUN / PART AB | | | | | | | |
|---|---|---|---|---|---|---|---|
| NO. | MACH. NAME | QTY. | NO. MACHINED | START TIME | SKIP TYPE | MEAS. NAME | |
| RUN COMP. 01 | PART A | 2 | 2 | | | | PART A MEAS. |
| RUN COMP. 02 | PART B | 1 | 1 | | | | PART B MEAS. |
| 03 | | | | | | | |
| 04 | | | | | | | |
| 05 | | | | | | | |
| 06 | | | | | | | |
| 07 | | | | | | | |
| 08 | | | | | | | |
| 09 | | | | | | | |
| 10 | | | | | | | |

OPEN  CLOSE

FIG. 9

```
SCHEDULE RUN / PART B
       NO.  MACH. NAME      QTY.  NO. MACHINED  START TIME  SKIP TYPE  MEAS. NAME

RUN COMP. 01  0100(MILLING)    1         1
RUN COMP. 02  0101(ROUGHING)   1         1                  CLASS+2
RUN COMP. 03  0102(ST. HOLE)   1         1                  TOOL
RUN COMP. 04  0103(DRILLING)   1         1                  CONDITION
RUN COMP. 05  0104(SPOT FAC)   1         1                  NEXT       HOLE DTH.MEAS.
RUN COMP. 06  0105(FIN.)       1         1                  WORK
          07
          08
          09
          10
```

| OPEN | CLOSE |

FIG. 10

| SCHEDULE RUN / PART AB | | | | | | | |
|---|---|---|---|---|---|---|---|
| NO. | MACH. NAME | PART NAME | QTY. | NO. MACHINED | START TIME | SKIP TYPE | MEAS. NAME |
| RUN COMP. 01 | PART A | | 2 | 2 | | | PART A MEAS. |
| RUN COMP. 02 | PART B | | 1 | 1 | | | PART B MEAS. |
| 03 | | | | | | | |
| 04 | | | | | | | |
| 05 | | | | | | | |
| 06 | | | | | | | |
| 07 | | | | | | | |
| 08 | | | | | | | |
| 09 | | | | | | | |
| 10 | | | | | | | |

OPEN  CLOSE

FIG. 11

SCHEDULE RUN / MEASUREMENT

| MEAS. NAME | PROGRAM NO. | MEAS. FREQ. (1/SET.) | CALL COUNT |
|---|---|---|---|
| PT. A MEAS. | 09000 | 5 | 3 |
| PT. B MEAS. | 09001 | 100 | 28 |
| PT. C MEAS. | 09002 | 20 | 0 |
| HOLE DTH.MEAS | 09003 | 30 | 3 |

DURING MEAS

| OPEN | CLOSE |

FIG. 18
PRIOR ART

SCHEDULING DATA SCREEN

| SCHEDULE ORDER | FILE NO. | REQ. REPS. | CUR. REP. |
|---|---|---|---|
| 01 | 0005 | 2 | 2 |
| 02 | 0008 | 1 | 1 |
| 03 | 0006 | 3 | 3 |
| 04 | 0009 | 0 | 0 |
| 05 | 0004 | 315 | 315 |
| 06 | 0011 | 9999 | 100 |
| 07 | 0015 | -1 | 0 |
| 08 | | | |
| 09 | | | |
| 10 | | | |

F0006 N0001 — 155

150

151 — SCHEDULE ORDER
152
153 — FILE NO.
154 — REQ. REPS.

| CLEAR | | | AUTO | DIR |

NUMERICAL CONTROL UNIT WITH SCHEDULE SKIP CAPABILITY

BACKGROUND OF THE INVENTION

1. Field of the Invention

The present invention relates to a numerical control unit for controlling the schedule run of an NC machine tool.

2. Description of the Conventional Art

The automatic timed control of scheduled events is a goal desired in many fields. For example, as disclosed in Laid Open Japanese Patent Publication 1-96003, the scheduling control of various units of lighting areas, energizing motors and operating various systems in buildings or factories is provided. Such goal also is desired in the automatic manufacture of products comprising one or more workpieces, including manufacture by numerical control.

Conventionally, a NC machine tool is controlled by a machining program, which gives the machine tool instructions with respect to the machining of a locus on a workpiece, machining conditions and the like, and responds to a variety of input data which may be stored or registered. The sequence of reading registered information concerning the program run sequence, the number or run times, run start time, etc. for the machining program (hereinafter "machining schedule data"), the reading of registered information for a measurement program which gives a machine tool instructions in regards to measurement locus and measurement conditions and the like (hereinafter "measurement schedule data"), and the running of the machine tool in accordance with the machining schedule data and measurement schedule data is commonly called a "schedule run" of the program.

FIG. 16 is a hardware configuration diagram of a conventional numerical control unit for performing a schedule run process, as disclosed in Japanese Patent Publication No. 200409 of 1989. FIG. 17 shows an example of a machining program file directory screen for the conventional numerical control unit. FIG. 18 illustrates a scheduling data screen example of the conventional numerical control unit.

An embodiment of the conventional art may be described in accordance with the drawings. First the hardware configuration example may be described with reference to FIG. 16, illustrating the hardware configuration of the known numerical control unit. In FIG. 16, a processor (CPU) 111 is used for controlling the whole numerical control unit via a common bus 126 in a conventional system architecture. A ROM 112 storing a control program, a RAM 113 storing various types of data, and a non-volatile storage 114, such as a bubble memory, storing various types of data, parameters, etc, are all accessible by the CBU via the system bus 126. Within memory 114 is scheduling data 114a for determining the machining programs that are to be employed for scheduling runs and the sequence of program execution.

Also connected to the system bus is a tape reader 115, used for reading a machining program, etc. from a paper tape, a display control circuit (CRTC) 116 for converting a digital signal into a display signal, a display device 116a, such as a CRT or a liquid crystal display device, and a keyboard 117 for entering various types of data.

The operational elements connected to the bus include a position control circuit 118 for controlling a servo motor. Circuit 118 connects to a servo amplifier 119 for controlling servo motor velocity, of a servo motor 120. A tachogenerator 121 is used for velocity feedback, and a position detector 122, such as a pulse coder or an optical scale, receives or inputs from generator 121 and outputs a signal to control circuit 118. While these elements are required for control of each of the machine axes, only those elements used for one axis are mentioned herein.

An I/O circuit 123 also connects to the bus 126 for transferring a digital signal to and from an external device, and a manual pulse generator 124 is connected into the system for moving each axis digitally.

An interface circuit 125 connects to bus 126 for transferring a signal to and from the external device. An external storage device 130, which may be a hard disk unit, is coupled with the interface 125 via a communication line 131. The external storage device is not limited to the hard disk unit but may be a floppy disk unit or a card reader unit which transfers data to and from an IC card.

In this configuration, a plurality of machining programs are stored in the external storage device 130, the sequence of executing the machining programs and the number of execution times are set and stored in-the non-volatile memory 114 as scheduling data 114a, and workpieces are machined according to the scheduling data 114a to allow the job shop type production of complicated workpieces.

FIG. 17 provides an example of a machining program file directory screen, wherein 140 indicates a file directory screen, 141 an indication denoting the file directory screen, 142 a file number section, 143 a file name section, and 144 represents file tape lengths. By setting a cursor on the screen to the file number 0000 and pressing a "SELECT" key 145, the screen progresses to a scheduling data screen.

FIG. 18 gives an example of the scheduling data screen, wherein 150 indicates a schedule data screen, 151 an indication denoting the schedule data screen, 152 a run sequence section, and 153 a run program file section. 154 indicates a program file run count section, meaning the number of workpieces to be machined. 155 indicates a currently run program file count section, meaning the number of workpieces already machined.

In a preferred order for programming the machining of several work pieces, the scheduling data screen 150 is first selected and the data of the run sequence 152, the program file 153 and the run count 154 are entered to complete the scheduling data. This scheduling data is then stored into the non-volatile memory 114 as the scheduling data 114a. By later selecting and executing this scheduling data 114a, a plurality of workpieces can be machined on a predetermined number basis. Multiple pieces of such scheduling data may be created and registered in the non-volatile memory 114.

The conventional numerical control unit configured as described above only executes the scheduling data in sequence and cannot achieve a scheduled run meeting complicated conditions in a practical machining environment, as described in several examples given below.

In one example, an alarm condition such as tool wear, machine-generated heat, consumable part wear or a machining program error may occur during actual, long-time unattended machining. Without a schedule changing function at the occurrence of alarm, the conventional numerical control unit stops its operation on occurrence of the alarm. Hence, if a schedule command is given to machine 100 workpieces during an unattended operation at night, the occurrence of alarm at the 10th workpiece leaves the remaining 90 workpieces unmachined until the morning, when the operators return to their assigned stations.

In another example, machining accuracy tends to deteriorate as the number of workpieces machined increases.

This is due to the thermal deformation of the machine, tool wear, etc. in actual long-period unmanned operation. To prevent this, it is desired to add a compensation factor to the original machining data by executing a tool measurement program every time several workpieces have been machined. Since the schedule run function of the known numerical control unit does not allow the measurement program to be registered independently of the machining program, the measurement program is registered together with the machining program. Therefore, the measurement program is called every time only one workpiece has been machined, increasing wasteful non-machining time and reducing productivity.

In a further example, assume that two types of parts, part A and part B, are machined by a machine tool which performs a schedule run. Also assume that two pieces of part B will be assembled to one piece of part A in a postprocess. In such a case, it is desired to machine one piece of part A and two pieces of part B as a set in order to decrease an intermediate stock between the machining process of the machine tool and the assembling postprocess. When one piece of part A and two pieces of part B cannot be mounted on one workpiece, a long list of schedule must be registered, e.g. one piece of part A and two pieces of part B, one piece of part A and two pieces of part B, . . . , in the schedule run function of the conventional numerical control unit. However, such registration is not practical because the number of schedule elements that can be registered is limited.

Hence, the parts are registered in blocks, e.g. 100 pieces of part A and 200 pieces of part B. This procedure produces an intermediate stock of 100 pieces of part A between the machining process of the machine tool and the assembling postprocess. Such a large intermediate stock requirement reduces the production efficiency of the whole manufacturing line.

In another example, when considering how to improve the productivity of a plant, which is not automatic in setup and chip removal work and requires an operator for machining, the warm-up time of a machine is non-production time. It is desired to have finished such warm-up in early morning, before the operator arrives at work.

In addition, for example, long-time continuous machining tends to deteriorate machining accuracy due to heat generation. To prevent this, it is desired to provide predetermined machine cooling time between schedules. However, since the schedule run function of the known numerical control unit cannot provide time-of-day information for the schedule, a desirable schedule run cannot be achieved.

Finally, the schedule data registration/display function known in the art is an independent function. Therefore, for example, if it is desired to correct the tool numbers of the following machining programs because tool breakage has taken place during the run of a machining program registered to the schedule, a memorandum of all the machining program numbers that follow must be made, a transition made to an edit screen from the keyboard, then the machining program numbers entered, and the machining programs corrected in the sequence written in the memorandum. Hence, a corrected machining program number error is apt to occur.

SUMMARY OF THE INVENTION

The present invention will overcome the aforementioned disadvantages in the conventional numerical control unit.

It is an object of the present invention to provide a numerical control unit which will not stop a schedule run if an alarm occurs during the run but will change the schedule in response to the alarm to continue the schedule run.

It is a further object of the present invention to provide a numerical control unit which has a schedule run function allowing a measurement program to be scheduled in addition to the scheduling of workpiece machining to ensure that the schedule run may be made for optimum measurement program execution.

It is a further object of the present invention to provide a numerical control unit which will allow the machining of a plurality of workpieces to be scheduled as one set.

It is a further object of the present invention to provide a numerical control unit which will allow time-of-day information to be included in the schedule and a run to be performed at desired time of day.

It is a further object of the present invention to provide a numerical control unit which will allow a direct transition to be made from a schedule data display screen to a machining program edit screen, without needing to take a memorandum.

The numerical control unit concerned with the first, second, third, fourth, fifth, sixth and tenth embodiments is designed to achieve the first goal and includes schedule skipping means for causing a schedule skip at the occurrence of an alarm.

The numerical control unit concerned with the seventh embodiment is designed to achieve the second goal and includes a memory for storing a measurement schedule.

The numerical control unit concerned with the eighth and ninth embodiments is designed to achieve the third goal and includes a memory allowing at least two or more schedule elements to be registered as one group.

The numerical control unit concerned with the eleventh and twelfth embodiments is designed to achieve the fourth goal and includes a memory for storing schedules and run start time of day corresponding to the schedule, a clock and time-of-day reading means.

The numerical control unit concerned with the thirteenth embodiment is designed to achieve the fifth goal and includes machining schedule specifying means, schedule display-to-edit transition means and edit-to-schedule display transition means.

The schedule skipping means in the first embodiment stops current machining when an alarm occurs, skips to an executable schedule, and resumes the schedule run.

The schedule skipping means in the second embodiment stops current machining when an alarm occurs, skips to a next machining program, and resumes the schedule run.

The schedule skipping means in the third embodiment stops current machining when an alarm occurs, skips to a next tool change command, and resumes the schedule run.

The schedule skipping means in the fourth embodiment stops current machining when an alarm occurs, skips to a next workpiece change command, and resumes the schedule run.

The schedule skipping means in the fifth embodiment stops current machining when an alarm occurs, skips to a next pallet change command, and resumes the schedule run.

Alarm type determining means in the sixth embodiment identifies an alarm type when an alarm occurs and activates the schedule skipping means associated with the identified alarm type. The schedule skipping means that is activated will stop the current machining, skip to an executable schedule, and resume the schedule run.

The schedule skipping means in the tenth embodiment stops current machining when an alarm occurs, skips to a specified layer, and resumes the schedule run.

The memory in the seventh embodiment stores a measurement schedule corresponding to a machining schedule. In the schedule run, not only the machining schedule but the measurement schedule as well is referenced to execute a measurement cycle.

The memory in the eighth embodiment allows a plurality of schedule elements to be stored as one group of schedule data. In the schedule run, the schedule elements belonging to the group are executed in sequence.

The memory in the ninth embodiment allows at least one or more groups of schedule elements to be stored as one higher-level group of schedule data. In the schedule run, the lowest-level schedule elements belonging to the group are executed in sequence.

The memory in the eleventh embodiment stores a schedule and run start time of day corresponding to that schedule. The clock counts the current time of day. A time of day reading means reads the current time of day from the clock, compares it with the run start time of day, and starts a schedule run when the current time of day has passed the run start time of day.

The memory in the twelfth embodiment stores a schedule and run start time of day corresponding to that schedule. The run start time of day is stored as a time increment referenced from a particular time of day, for example, the preceding machining end time of day. The clock counts the current time of day. The time-of-day reading means reads the current time of day from the clock, compares it with the run start time of day, and starts a schedule run when the current time of day has passed the run start time of day.

The machining schedule specifying means in the thirteenth embodiment is capable of reading the name of a machining schedule block at the cursor. The schedule display-to-edit transition means calls a machining program corresponding to the name of the machining schedule block and activates the editing means. The edit-to-schedule display transition means searches for a schedule block wherein the machining program called on the edit screen has been registered and activates the machining schedule displaying means.

BRIEF DESCRIPTION OF THE DRAWINGS

FIG. 7 shows a main schedule run setting display screen displayed on a CRT/MDI unit according to an embodiment of the present invention.

FIG. 8 illustrates a "PART AB" schedule run setting display screen displayed on a CRT/MDI unit according to an embodiment of the present invention.

FIG. 9 illustrates a "PART B" schedule run setting display screen displayed on the CRT/MDI unit according to an embodiment of the present invention.

FIG. 10 shows a setting display screen, wherein "PART B MEASUREMENT" has been selected for the "PART AB" schedule run, displayed on the CRT/MDI unit according to an embodiment of the present invention.

FIG. 11 shows a measurement schedule setting display screen displayed on the CRT/MDI unit according to an embodiment of the present invention.

FIG. 18 gives an example of a scheduling data screen of the prior art numerical control unit.

DESCRIPTION OF THE PREFERRED EMBODIMENT

Figure 1:
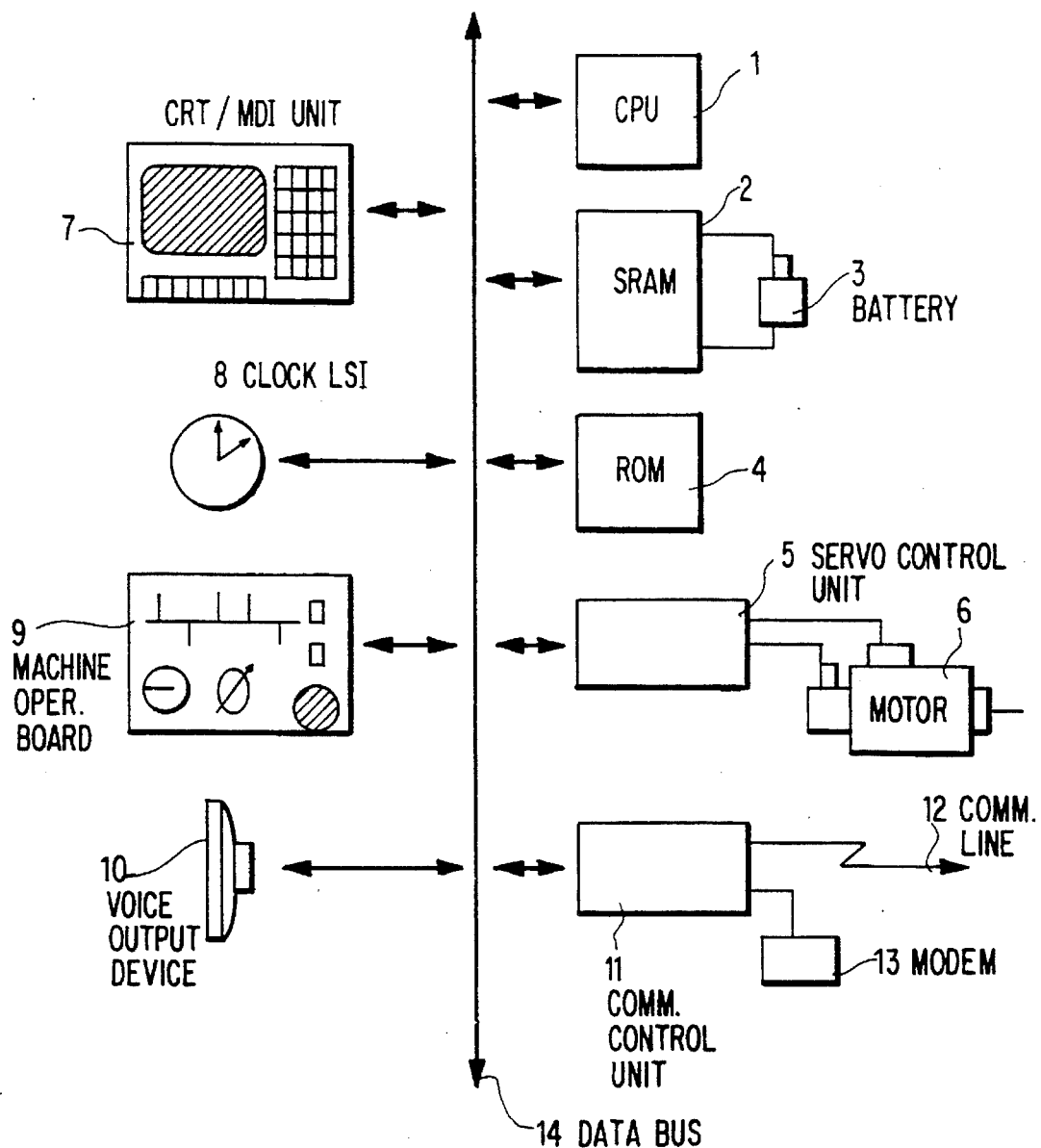
FIG. 1 is a hardware block diagram of a numerical control unit according to a first embodiment of the present invention.

A first embodiment of the present invention will now be described in reference to the appended drawings. In FIG. 1, a CPU 1 of a microprocessor is incorporated in a numerical control unit for executing a command in accordance with a control program written in a ROM 4, reading time of day from a clock LSI 8, transferring data to and from an SRAM 2, carrying out machine control by entering signals of a CRT/MDI unit 7 and a machine operation board 9, conducting machining locus control by sending a command to a servo control unit 5, transmitting and displaying data on the CRT/MDI unit 7, generating a voice by sending a command to a voice output device 10, transmitting various data by sending data to a communication unit 11, and receiving from a communication control unit data sent through a communication line and a modem. All of these operations are conducted via a data bus 14 that connects the CPU to other units.

Specifically, a random access memory 2 for storing machining command programs, machining schedules, measurement schedules, run start time of day, etc, is backed up by a battery 3 so that the memory 2 allows the data to be stored while the power of the numerical control unit is off. The servo control unit 5 is operative for driving a motor 6, in accordance with a command from the CPU 1, which effects the operation of a machine.

The CRT/MDI unit 7 is employed in the interactive control and monitoring of the numerical control unit by an operator and comprises a display for visually providing relevant information. A voice output device 10 is used for similar purposes and generates a voice or other audible message according to commands from the CPU 1. A machine operation board is operative to generate machine operation signals, such as automatic start and reset, according to the activity of the operator.

The clock LSI 8 provides the current time of day and allows it to be read.

The communication control unit 11 is used for transmitting data from the CPU 1 to a communication line 12 and a modem 13 in accordance with a communication protocol and transferring to the CPU 1 data sent through the communication line and the modem. Specifically, the modem 13 is connected between a telephone line and the communication control unit 11 for bidirectional communication protocol conversion, allowing data to be transferred via the telephone line to a host computer (not shown) or the like.

Figure 2:
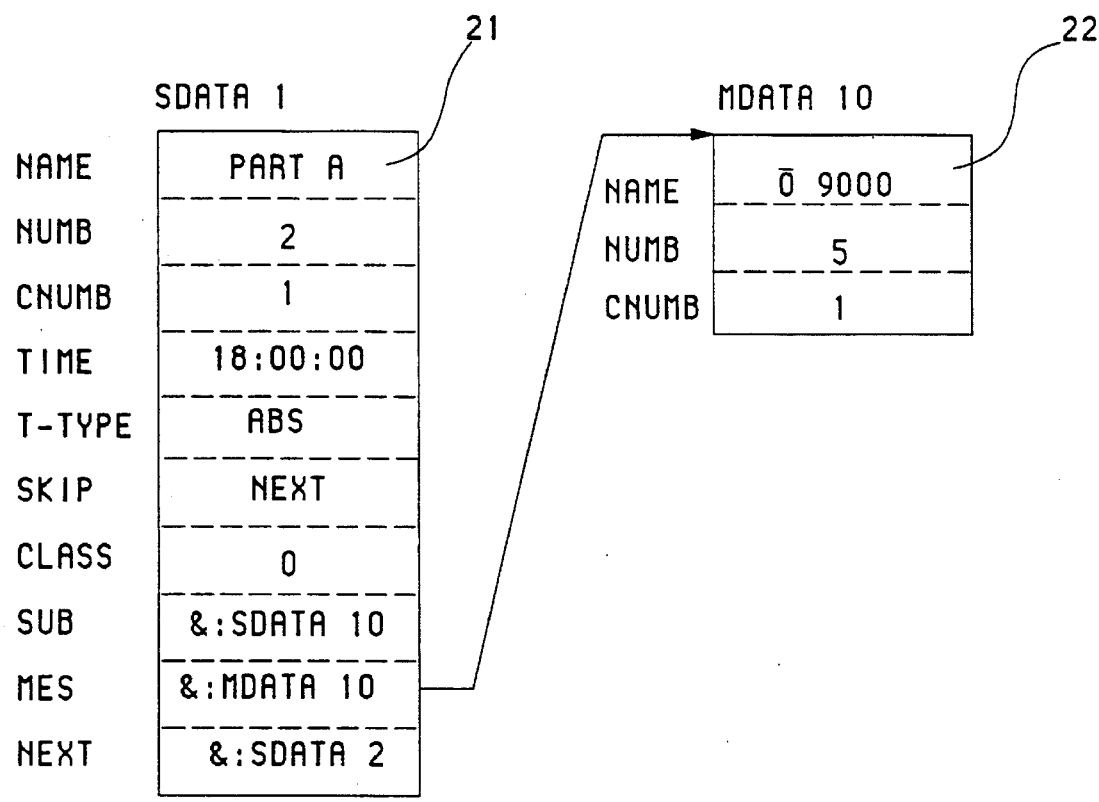
FIG. 2 is a table diagram showing a single-block structure of machining schedule data and that of measurement schedule data according to an embodiment of the present invention.

FIG. 2 is a table illustrating the structure of one block 21 of machining schedule data and one block 22 of measurement schedule data in the first embodiment of the present invention. These blocks of data are stored in the SRAM 2. In the structure of the one block of machining schedule data:

"name" indicates the name of a schedule element, wherein a part name or a program number is set. In this example, a part name "Part A" has been set;

"numb" indicates the number of machining operations to be repeated. In this example, 2 has been set, representing that two pieces of part A will be machined in this schedule;

"cnumb" indicates the number of machining operations already repeated. In the example, it is 1, indicating that one piece of part A has already been machined;

"time" indicates time information and "t type" a type of time information If "t type" is "ABS," "time" is the absolute time of day, and if it is "INC," "time" is incremental time from a preceding schedule element. "t type" of "ABS" in this example indicates that this schedule is started at 18 o'clock;

"skip" indicates a skip destination at the occurrence of alarm. "0" does not cause a skip. "NEXT" causes a skip to a next machining program, "TOOL" to a next tool change command, "WORK" to a next workpiece change command, "PALLET" to a next pallet change command, "CONDITION" to a skip destination specified by a condition, and "CLASS" to a program scheduled to be run most recently in a specified layer. "NEXT" has been set in this example;

"class" specifies a layer of a skip destination when the "skip" element is specified as "CLASS". A "class" of 0 indicates an identical layer, 1 one layer up, and −1 one layer down. Since "skip" is not specified to be "CLASS" in the example, "class" is insignificant.

"sub" indicates a pointer denoting a block of schedule one layer down. "sub" is 0 when there is no lower layer. The example indicates that a block "sdata10" is in a lower layer.

"mes" indicates a pointer representing a block of measurement schedule. "mes" is 0 when there is no block of measurement schedule. The example shows that there is a block of measurement schedule named "mdata1."

"next" indicates a pointer denoting a block of schedule to be run next. "next" is 0 when there is no schedule to be run next (i.e. a final block). The example indicates that a block "sdata" 2 will be run next.

The structure of one block of measurement schedule data will now be described.

"name" indicates a name of a measurement program, wherein "O9000" has been set in the example.

"numb" indicates how many times a parent block of the measurement schedule block will be run before the measurement program is run once. 5 has been set in this example, indicating that 09000 is executed once every time 5 pieces of part A are machined.

"cnumb" indicates a cyclic counter which counts up each time the parent block of the measurement schedule block is run and is cleared to zero every time the number set to "numb" is reached or exceeded. 1 has been set in the example, indicating that 1 piece of part A has been machined after the preceding measurement.

Figure 3:
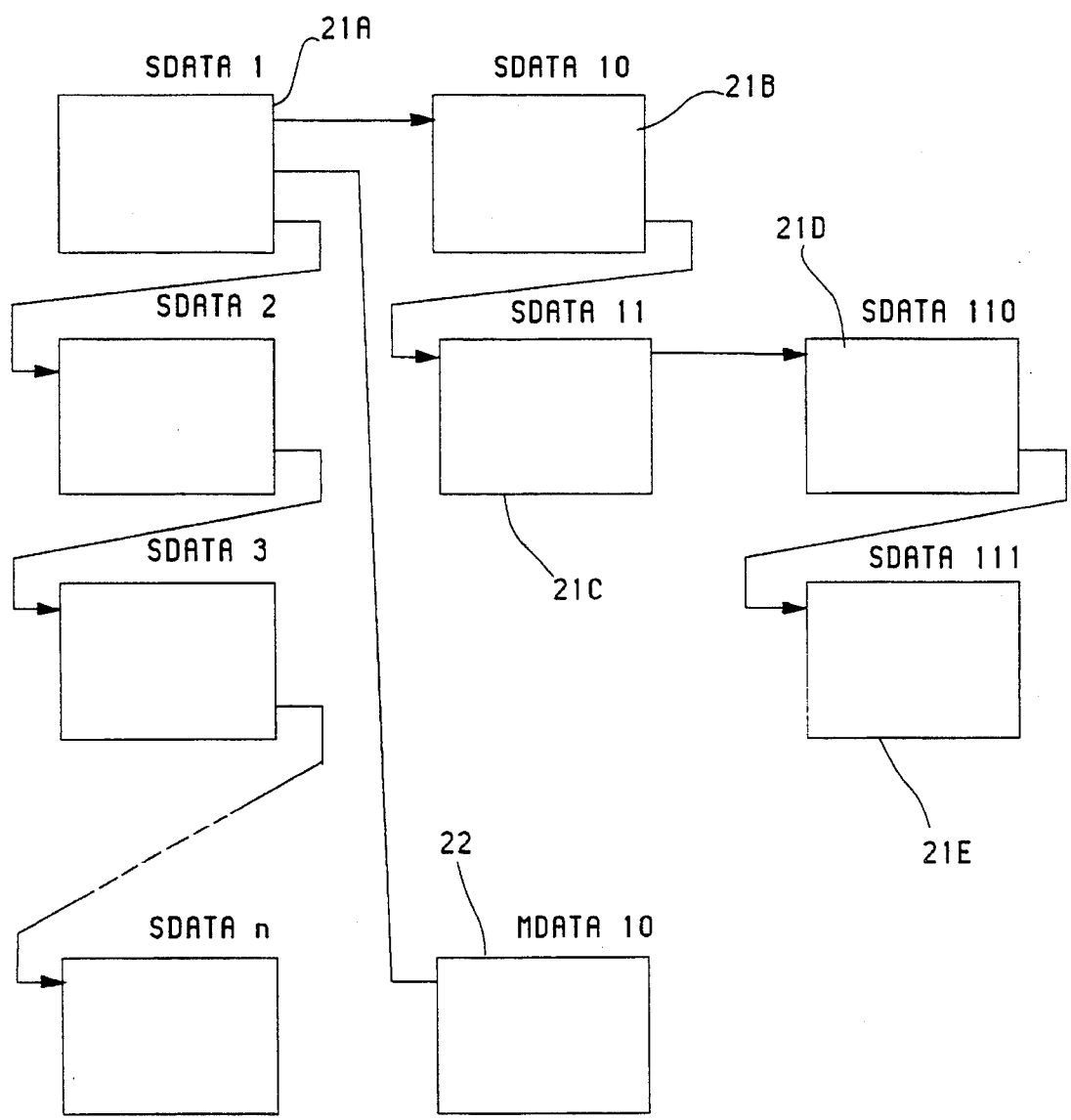
FIG. 3 is a table diagram illustrating registration examples of the machining schedule data and the measurement schedule data according to an embodiment of the present invention, in connection with blocks.

FIG. 3 illustrates the registered examples of machining schedule data and measurement schedule data in the first embodiment of the present invention, organized in connection with the performance of their constituent blocks. In FIG. 3, "sdata1" indicates a block that is run first. "sdata1" consists of two blocks, "sdata10" and "sdata11," and further "sdata11" is made up of two blocks, "sdata110" and "sdata111." Accordingly, "sdata1" is terminated after the blocks "sdata 10," "sdata110" and "sdata111" are run several times.

"mdata10" is a measurement schedule block connected to "sdata1" and is provided with a counter which counts up every time "sdata1" is executed. A measurement program is run once every set number of times. "sdata2" indicates a machining schedule block connected to "sdata1" and is run after "sdata1" is terminated. Similarly, "sdata2" is connected to "sdata3" and linked up to final "sdatan."

As seen in the illustrated example, there are three classes of blocks and the various blocks are shown to exist in up to three layers. The first layer block is conventionally identified as a "parent" block while the derivative or dependent blocks in lower layers are called "child" blocks. In the illustrated example, sdata1 block 21A is a parent machining block that itself would not be machined but its derivative block sdata10 21B is a child block that is machined while its derivative block sdata11 21C is a child block that is not machined, although it further derivative blocks 21D and 21E at the lowest layer are machined.

Figure 4A:
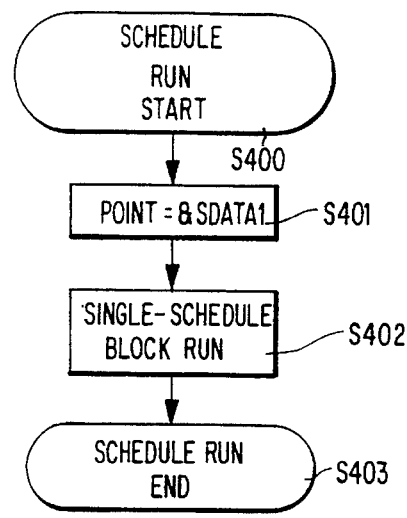
FIGS. 4(a) and 4(b) show main function and single-schedule block run processing flowcharts, respectively, according to an embodiment of the present invention.

Operation of the first embodiment will now be described in connection with FIG. 4(a), which is a processing flowchart of a main function for schedule run control. This function is called when the schedule run is started, at step 400.

Step 401: First, an address (&sdata1) of a first schedule block (sdata1) is assigned to a pointer local variable (point) indicating the address of the schedule block.

Step 402: A "single-schedule block run" subroutine is then called using the "point" as an argument. While tracing the schedule blocks one after another, this subroutine will run all schedule blocks according to the schedule.

Step 403: The schedule run is terminated.

Figure 4B:
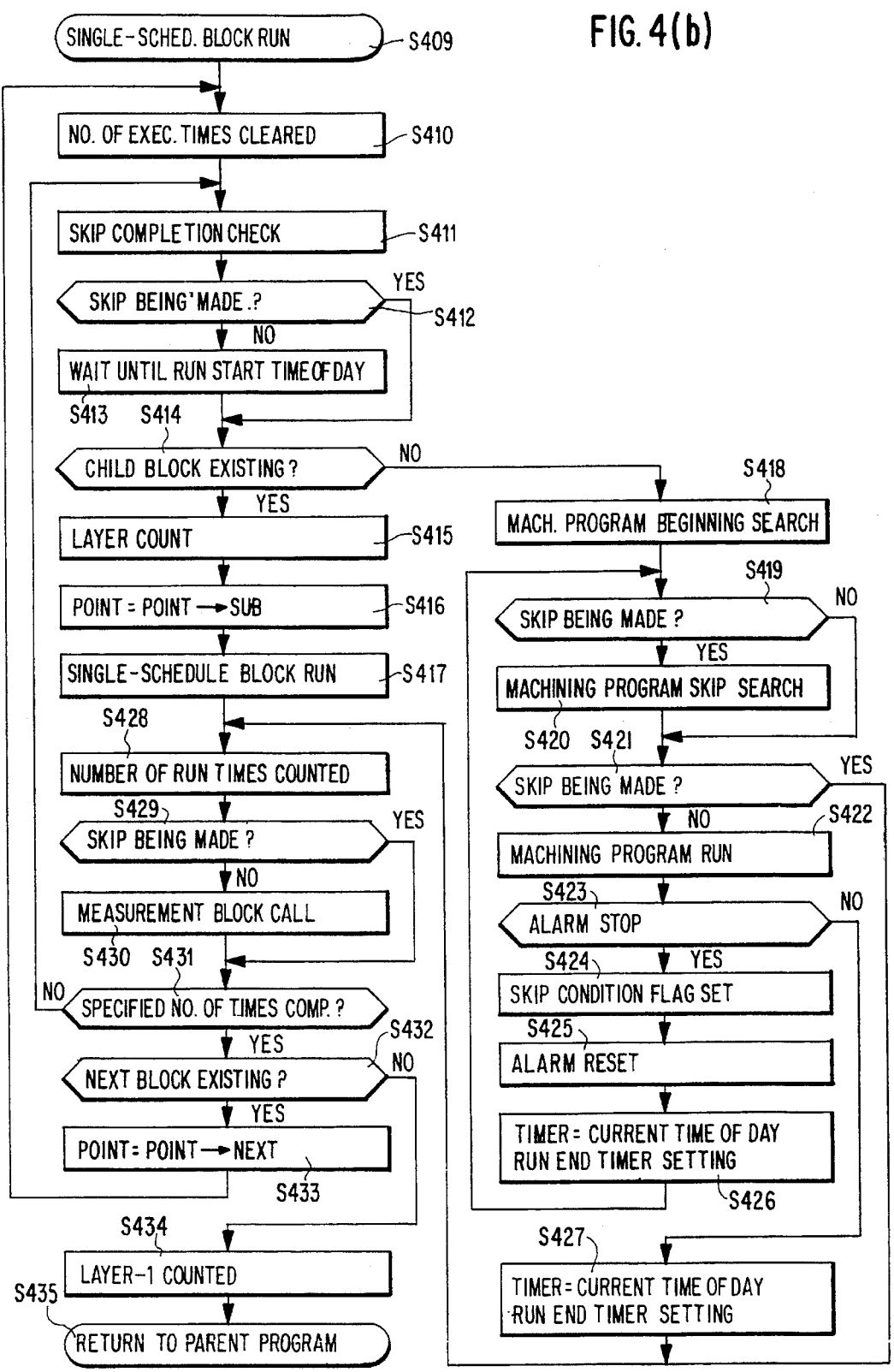

FIG. 4(b) is a processing flowchart of the single-schedule block run and begins at step 409. To this subroutine, the parent program passes the pointer local variable (point) indicating the address of the schedule block to be run.

Step 410: The number of run times is first cleared to zero (cnumb=0).

Step 411: A "skip completion check" subroutine is called to check if a schedule skip is complete or not.

Step 412: A check is made to see if the schedule skip is being made or not. The skip is being made if a skip flag is on. Since it is not necessary to wait until the run start time of day during a skip, the processing branches to step 414.

Step 413: A "wait until run start time of day" subroutine is called and the processing waits until the current time of day passes the run start time of day.

Step 414: A check is made to see if there is a child block or not. There is a child block unless "sub" of the machining schedule block is 0. If there is no child block, the processing branches to step 418 and performs a machining program run. If there is a child block, the processing progresses to step 415 and performs a child block run.

Step 415: Since the child block is to be run, a global variable (classno), used to count layers for checking a layer skip, is counted up.

Step 416: To run the child block, the address of the child block (point) is read from "sub" and set to the argument of the "single-schedule block run" subroutine.

Step 417: The "single-schedule block run" subroutine is called and the child block and all subsequent blocks are run according to the schedule. As described above, the "single-schedule block run" subroutine is a recursive function capable of calling itself, which logically allows the blocks in an infinitely deep layer to be run according to the schedule if there is no limit to the memory size.

Step 418: When there is no child block, the processing branches from the step 414. In this case, a program set to the "name" of this block is run. Hence, a "beginning of machining program search" subroutine is called and the beginning of the program set to the "name" is searched for.

Step 419: If a skip is being made, the processing advances to step 420 to perform a skip search.

Step 420: A "machining program skip search" subroutine is called and a search is made within the machining program found by searching for the beginning of the machining program. For example, a tool change command or a pallet change command is searched for and the skip flag is switched off.

Step 421: A check is made to see if the skip is being made or not. If the skip is being made, the processing branches to step 428 since it is not necessary to run.

Step 422: If a skip is not being made, a "machining program run" subroutine is called and a run is made up to the end of the machining program or until an alarm stop occurs.

Step 423: A check is made to see if the run has been stopped by alarm or not. If the run has been terminated without fault, the processing branches to step 427 to run a next schedule, and the current time of day is read from the clock and assigned to a global variable (timer) for storing the run end time of day. The processing then branches to step 428.

Step 424: When the run has been stopped by alarm, a "skip condition flag set" subroutine is called to set a global variable skip mode indicating a skip type and the skip flag.

Step 425: To resume the schedule, the alarm is reset.

Step 426: The current time of day is read from the clock and assigned to the global variable (timer) for storing the run end time of day. The processing then returns to the step 419, makes the machining program skip search, and resumes the run when the skip has been found. If it has not been found, the processing branches to step 428 during the skip and moves on to the next block.

Step 428: The number of run times (cnumb) of this schedule block is counted up.

Step 429: A check is made to see if the skip is being made or not. If the skip is being made, the processing branches to step 431 because measurement need not be conducted.

Step 430: A "measurement block call" subroutine is called to run the measurement block.

Step 431: A comparison is made between the specified number of runs to be made (numb) and the number of runs actually made (cnumb) for this schedule block to check whether the run has been made the specified number of times. If the run has not yet been performed the specified number of times, the processing branches to the step 411 to run this block again.

Step 432: When the run has been made the specified number of times, a check is made to see if a next block exists or not. When "next" is 0, there is no next block. When there is a next block, the address of the next block is read from "next" and assigned to the pointer local variable (point) indicating the block address (at step 433), and the processing branches to the step 410, thereby running the next block.

Step 434: Since the processing returns to the parent block when the next block does not exist, the global variable (classno) employed to count layers for checking the layer skip is counted down.

Step 435: The processing returns to the function of the parent program.

Figure 5A:
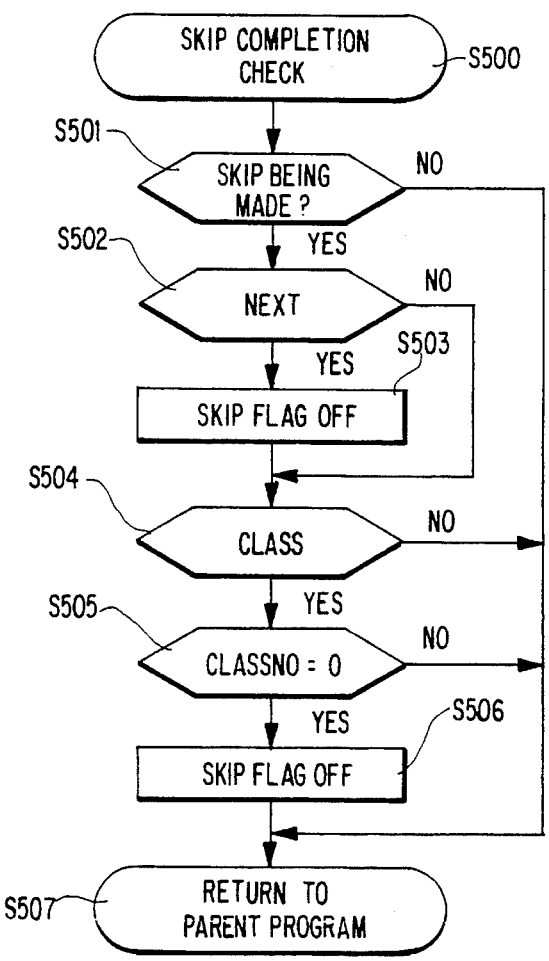
FIGS. 5(a), 5(b) and 5(c) show skip completion check, run start time of day wait, and machining program skip search processing flowcharts, respectively, according to an embodiment of the present invention.
Figure 5B:
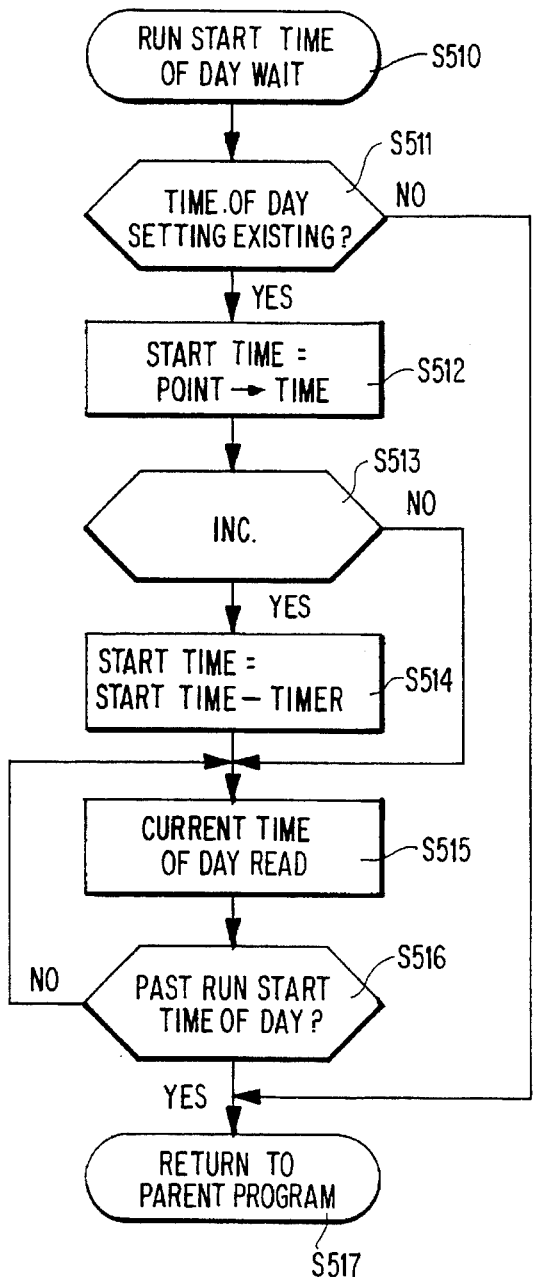
Figure 5C:
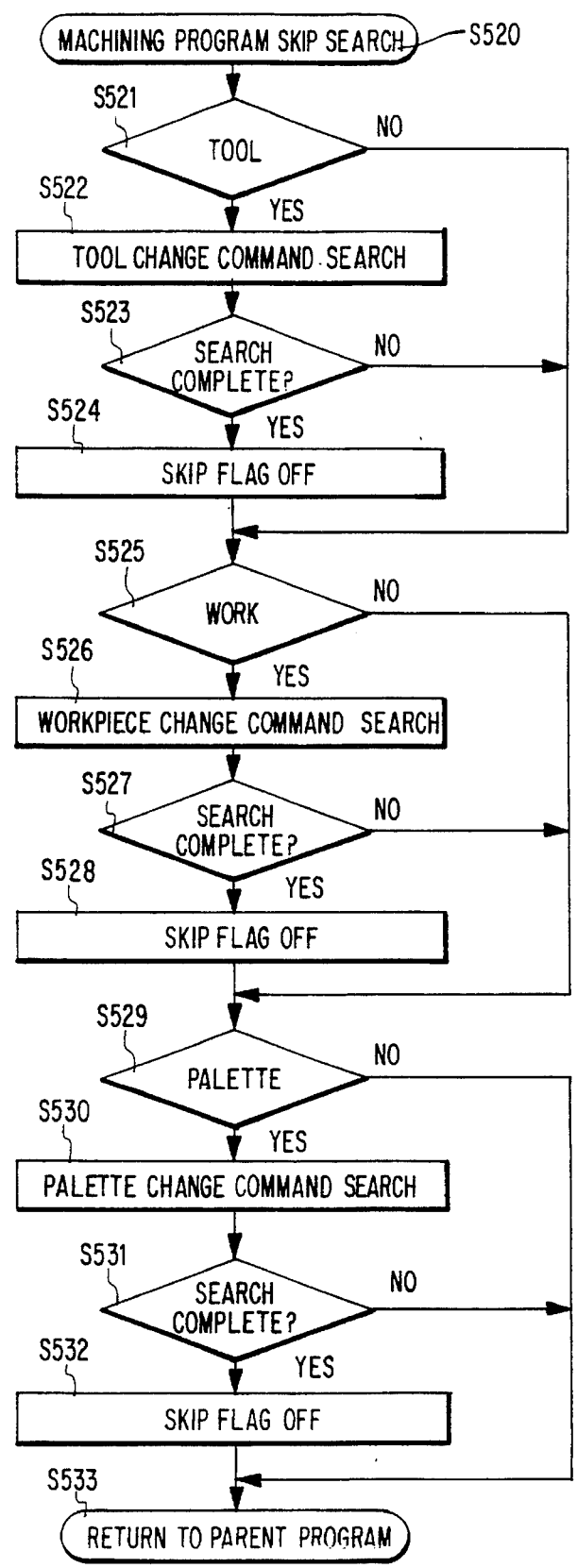

FIG. 5(*a*) is a skip completion check processing flowchart that begins at START step 500.

Step 501: Since the skip is complete if the skip is not being made, the processing branches to step 507 and returns to the parent program.

Step 502: If the skip mode is "NEXT," reaching the beginning of the single-schedule block run should cause the next program to be run. Hence, the skip flag is switched off at step 503 to complete the skip.

Step 504: If the skip mode is "CLASS" and (step 505) "classno" is 0, the layer skip is complete. The skip flag is therefore switched off at step 506 to complete the skip.

Step 507: The processing returns to the parent program.

FIG. 5(*b*) is a "wait until run start time of day" processing flowchart that begins at START step 510.

Step 511: A check is made to see if the time of day has been set or not. If "time" of the schedule block is not 0, the time of day has been set. Since it is not necessary to wait until the start time of day if the time of day has not been set, the processing branches to step 517 and returns to the parent program.

Step 512: The "time" of the schedule block is assigned to a local variable (start-time) indicating the run start time of day.

Step 513: A check is made to see if the time of day set value is an increment or an absolute value. The set value is an increment if "t-type" of the schedule block is "INC." If it is an increment, run end time of day is added to the "start-time" at step 514 to find the "start-time" on an absolute time of day basis. Since the "start-time" is already the absolute time of day if the set value is not an increment, the processing branches to step 515.

Step 515: The current time of day is read from the clock.

Step 516: The current time of day is compared with the "start-time" to check whether it is past the run start time of day. If the run start time of day is not yet reached, the processing branches to the step 515 and waits until the run start time of day is reached. When it is past the run start time of day, the processing advances to step 517 and returns to the parent program.

FIG. 5(*c*) is a machining program skip search processing flowchart that begins with START step 520.

Step 521: A check is made to see if the skip mode is "TOOL" or not. If it is not "TOOL," the processing branches to step 525.

Step 522: The machining program currently being executed or having been found by searching its beginning is searched from the beginning to the end for a tool change command.

Step 523: If a tool change command has not been found until the end, the processing branches to step 525 without any further execution to search the next machining program for the command.

Step 524: Since the tool change command has been found, the skip flag is switched off to complete the skip. Accordingly, the next machining program is run, beginning with the tool change command found.

Step 525: A check is made to see if the skip mode is "WORK" or not. If it is not "WORK," the processing branches to step 529.

Step 526: The machining program currently being executed or having been found by searching its beginning is searched from the beginning to the end for a workpiece change command.

Step 527: If a workpiece change command has not been found until the end, the processing branches to step 529 without any further execution to search the next machining program for the command.

Step 528: Since the workpiece change command has been found, the skip flag is switched off to complete the skip. Accordingly, the next machining program is run, starting with the workpiece change command found.

Step 529: A check is made to see if the skip mode is "PALLET" or not. If it is not "PALLET," the processing branches to step 533.

Step 530: The machining program currently being executed or having been found by searching its beginning is searched from the beginning to the end for a pallet change command.

Step 531: If a pallet change command has not been found until the end, the processing branches to step 533 without any further execution to search the next machining program for the command.

Step 532: Since the pallet change command has been found, the skip flag is switched off to complete the skip. Accordingly, the next machining program is run, beginning with the pallet change command found.

Step 533: The processing returns to the parent program.

Figure 6B:
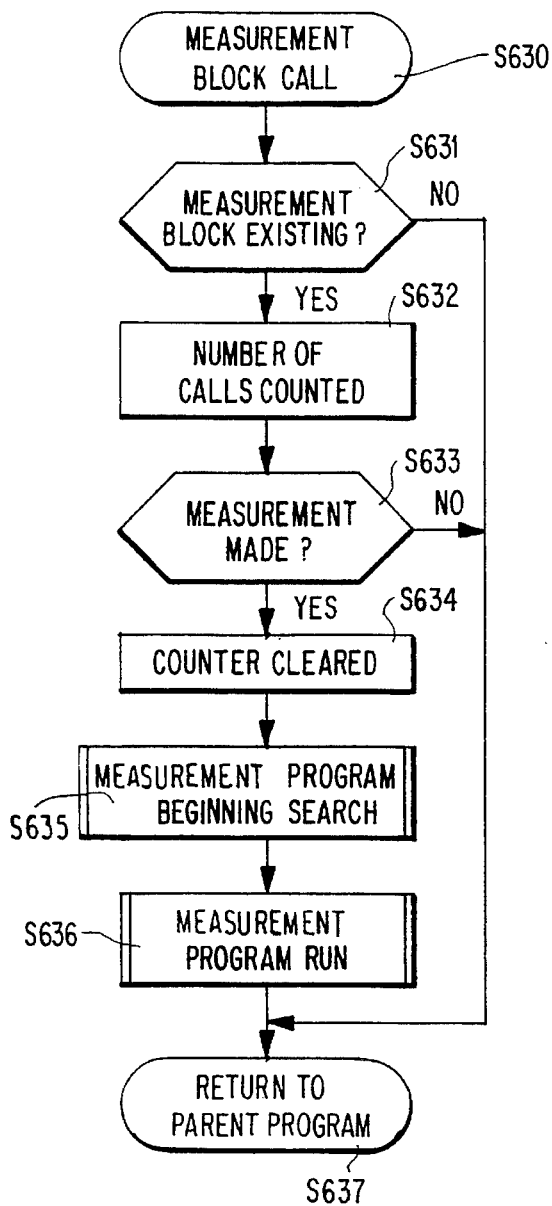
FIGS. 6(a) and 6(b) illustrate skip condition flag set and measurement block call processing flowcharts, respectively, according to an embodiment of the present invention.
Figure 6A:
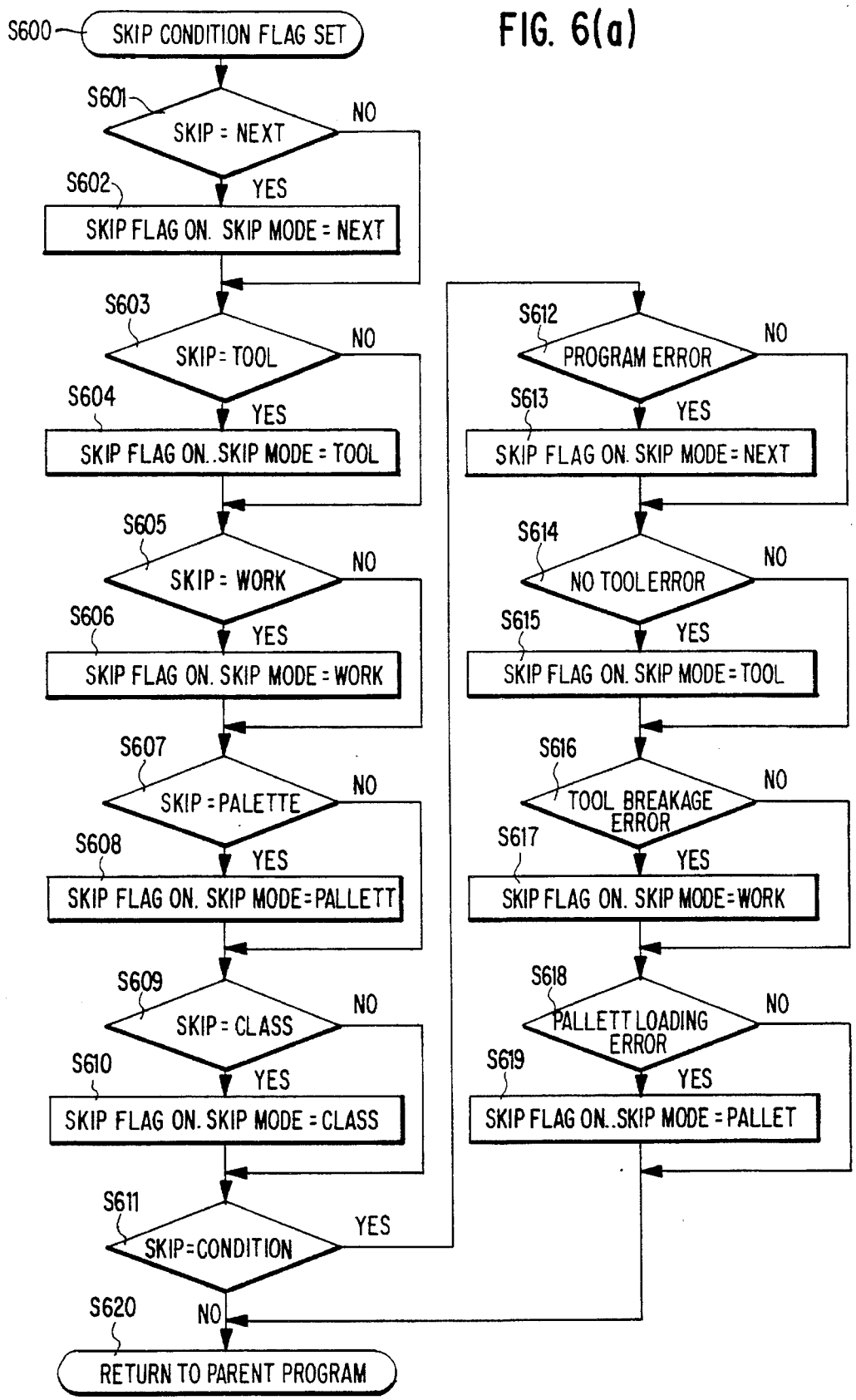

FIG. 6(a) is a skip condition flag set processing flowchart, that begins with START step 600.

Step 601: The "skip" of the schedule block is checked. If the "skip" is not "NEXT," the processing branches to step 603.

Step 602: If the "skip" is "NEXT," the skip flag is switched on to set "NEXT" to the skip mode.

Step 603: The "skip" of the schedule block is checked. If the "skip" is not "TOOL," the processing branches to step 605.

Step 604: If the "skip" is "TOOL," the skip flag is switched on to set "TOOL" to the skip mode.

Step 605: The "skip" of the schedule block is checked. If the "skip" is not "WORK," the processing branches to step 607.

Step 606: If the "skip" is "WORK," the skip flag is switched on to set "WORK" to the skip mode.

Step 607: The "skip" of the schedule block is checked. If the "skip" is not "PALLET," the processing branches to step 609.

Step 608: If the "skip" is "PALLET," the skip flag is switched on to set "PALLET" to the skip mode.

Step 609: The "skip" of the schedule block is checked. If the "skip" is not "CLASS," the processing branches to step 611.

Step 610: If the "skip" is "CLASS," the skip flag is switched on to set "CLASS" to the skip mode. The "class" of the schedule block is also read and set to "classno."

Step 611: The "skip" of the schedule block is checked. If the "skip" is not "CONDITION," the processing branches to step 620. If the "skip" is "CONDITION," the processing branches to the step 612.

Step 612: The alarm is checked. If the alarm is not a "program error," the processing branches to step 614.

Step 613: Since the alarm is a "program error," the processing causes a skip to the next machining program. The skip flag is switched on and "NEXT" is set to the skip mode.

Step 614: The alarm is checked. If the alarm is not a "no-tool error," the processing branches to step 616.

Step 615: Since the alarm is a "no-tool error," it is desired to abandon the machining with this tool and resume the machining with a next tool. Hence, the processing causes a skip to the next tool change command. The skip flag is switched on and "TOOL" is set to the skip mode.

Step 616: The alarm is checked. If the alarm is not a "tool breakage error," the processing branches to step 618.

Step 617: Since the alarm is a "tool breakage error," this workpiece probably was damaged when the tool was broken. Therefore, it is desired to abandon the machining of this workpiece and resume the machining for a next workpiece. Hence, the processing causes a skip to the next workpiece change command. The skip flag is switched on and "WORK" is set to the skip mode.

Step 618: The alarm is checked. If the alarm is not a "pallet loading error," the processing branches to step 620.

Step 619: Since the alarm is a "pallet loading error," it seems that the pallet cannot be loaded to the machine properly or use of this pallet may be impossible. Therefore, it is desired to abandon the machining using this pallet and resume the machining employing a next pallet. Hence, the processing causes a skip to the next pallet change command. The skip flag is switched on and "PALLET" is set to the skip mode.

Step 620: The processing returns to the parent program.

FIG. 6(b) is a measurement block call processing flowchart which begins with START step 630.

Step 631: A check is made to see if a measurement block is present or absent. The measurement block exists if "mes" of the schedule block is not 0. If there is no measurement block, the processing branches to step 637 and returns to the parent program.

Step 632: Since there is a measurement block, the number of measurement block call times is counted up. "cnumb" of the measurement block indicates the number of call times.

Step 633: A check is made to see if measurement is made or not. A comparison is made between "cnumb" and "numb" of the measurement block. The measurement is made if "cnumb" is equal to or greater than "numb." If the measurement is not performed, the processing branches to step 637 and returns to the parent program.

Step 634: Since the measurement is carried out, the number of measurement block call times "cnumb" is cleared to zero.

Step 635: To run the measurement program, the beginning of the measurement program is searched for by using the measurement program name (name) set to the measurement block as an argument.

Step 636: The measurement program is run.

Step 637: The processing returns to the parent program.

FIG. 7 shows a schedule run setting/display screen displayed on the CRT/MDI unit 7, wherein "MACHINING NAME" indicates a setting/display section of names on a schedule basis. In this example, two schedules of "PART AB" and "PART C" have been registered. "QTY" indicates the number of schedule repetitions, and "NO. MACHINED" the number of run repetitions from when the run of "PART AB" is started finally. "START TIME" indicates reserved run start time of day or run interval time. "SKIP TYPE" indicates a type of a schedule skip caused when alarm occurs. "MEASUREMENT NAME" indicates the name of a measurement schedule block called for in a schedule run.

Concerning "PART AB", 2 in the "QTY" section indicates that machining was scheduled to be repeated twice and 2 in the "NO. MACHINED" means that the machining has been repeated twice. 18:00:00 in the "START TIME" section tells that the machining was specified to start at 18 o'clock sharp. Since there is no setting in the "SKIP TYPE" section, a skip was not designated at the occurrence of alarm. Because nothing has been set in "MEASUREMENT NAME," no measurement is made after the run of "PART AB."

In regards to "PART C," 100 in the "QTY" section indicates that 100 pieces have been set for machining and 58 in "NO. MACHINED" shows that 58 pieces have been machined.

00:00:40INC in the "START TIME" section means that the machining is done at intervals of 40 seconds. No setting in "SKIP TYPE" tells that an alarm-time skip is not specified. "PART C MEASUREMENT" in "MEASUREMENT NAME" denotes that the measurement schedule block "PART C MEASUREMENT" is called every time the machining of "PART C" is over.

The run status of each schedule block is displayed at the left end of the screen. In this example, the run of "PART AB" is complete and that of "PART C" is being made.

A horizontal line under "PART AB" is a cursor which is moved on the screen by pressing cursor keys (such as →, ←, ↑ and ↓) to select any of the display items. "PART AB" has been selected in the example. By pressing a key corresponding to "OPEN" in this state, the details of "PART AB" can be displayed.

FIG. 8 shows a display screen of the detailed schedule of "PART AB." In the example, "PART AB" consists of two schedule blocks, "PART A" and "PART B."

Pressing a key corresponding to "CLOSE" on this screen returns to a higher-level schedule screen shown in FIG. 7.

In the example in FIG. 8, the cursor is located under "PART B," indicating that "PART B" is being selected. By pressing the key associated with "OPEN" in this state, the details of "PART B" can be displayed.

FIG. 9 provides the detailed schedule of "PART B." Pressing the key associated with "CLOSE" on this screen returns to the screen in FIG. 8.

According to the example in FIG. 9, the schedule block "PART B" comprises six blocks; "O100(MILLING)," "O101(ROUGHING)," "O102(STARTING HOLE)," "O103(DRILLING)," "O104(SPOT FACING)" and "O105(FINISHING)."

The "SKIP TYPE" for "O100(MILLING)" is "CLASS+2" which causes a skip two classes up ("PART AB" or "PART C") when an alarm occurs.

The "SKIP TYPE" for "O100(MILLING)" is "TOOL" which causes a skip to the next tool change command at the occurrence of an alarm.

The "SKIP TYPE" for "O102(STARTING HOLE)" and "O103(DRILLING)" is "CONDITION" which causes a skip according to the alarm type at the occurrence of an alarm.

The "SKIP TYPE" for "O104(SPOT FACING)" is "NEXT" which causes a skip to the next program ("O105(FINISHING)") at the occurrence of an alarm.

The "SKIP TYPE" for "O105(FINISHING)" is "WORK" which causes a skip to the next workpiece change command at the occurrence of an alarm.

Like FIG. 8, FIG. 10 gives the details of the schedule block "PART AB," wherein the cursor is located under "PART B MEASUREMENT" indicating that "PART B MEASUREMENT" has been selected. By pressing the key corresponding to "OPEN" in this state, the details of "PART B MEASUREMENT" can be displayed.

FIG. 11 displays the details of "PART B MEASUREMENT" along with those of the other measurement schedule blocks. In this example, four measurement blocks, "PART A MEASUREMENT," "PART B MEASUREMENT," "PART C MEASUREMENT" and "HOLE DEPTH MEASUREMENT" are being displayed. "PROGRAM NO." denotes a measurement program number. In the example, the program number for "PART B MEASUREMENT" is "o9001."

"MEASUREMENT FREQUENCY(1/SETTING)" indicates how many times the measurement block is called before the measurement program is executed once. In the example, "PART B MEASUREMENT" is made once every time the measurement block is called 100 times.

"CALL COUNT" indicates how many times the measurement block has been called after the previous measurement was made. In the example, the measurement block has been called 28 times after "PART B MEASUREMENT" was made. When the measurement block is called 72 more times, measurement is made and "CALL COUNT" is cleared to zero.

A run status is indicated on the left end. In the example, "PART C MEASUREMENT" is being made.

Pressing the key corresponding to "CLOSE" on this screen returns to the display of the schedule block from which the selected measurement block has been called. Since "PART B MEASUREMENT" is selected in the example, the display returns to the screen in FIG. 10.

In FIG. 9, the cursor is under "O103(DRILLING)." By pressing the key corresponding to "OPEN" in this state, the details of "O103(DRILLING)" are displayed. Since "O103(DRILLING)" is the lowest-level schedule block, a program as shown in FIG. 12 is displayed.

Figure 12:
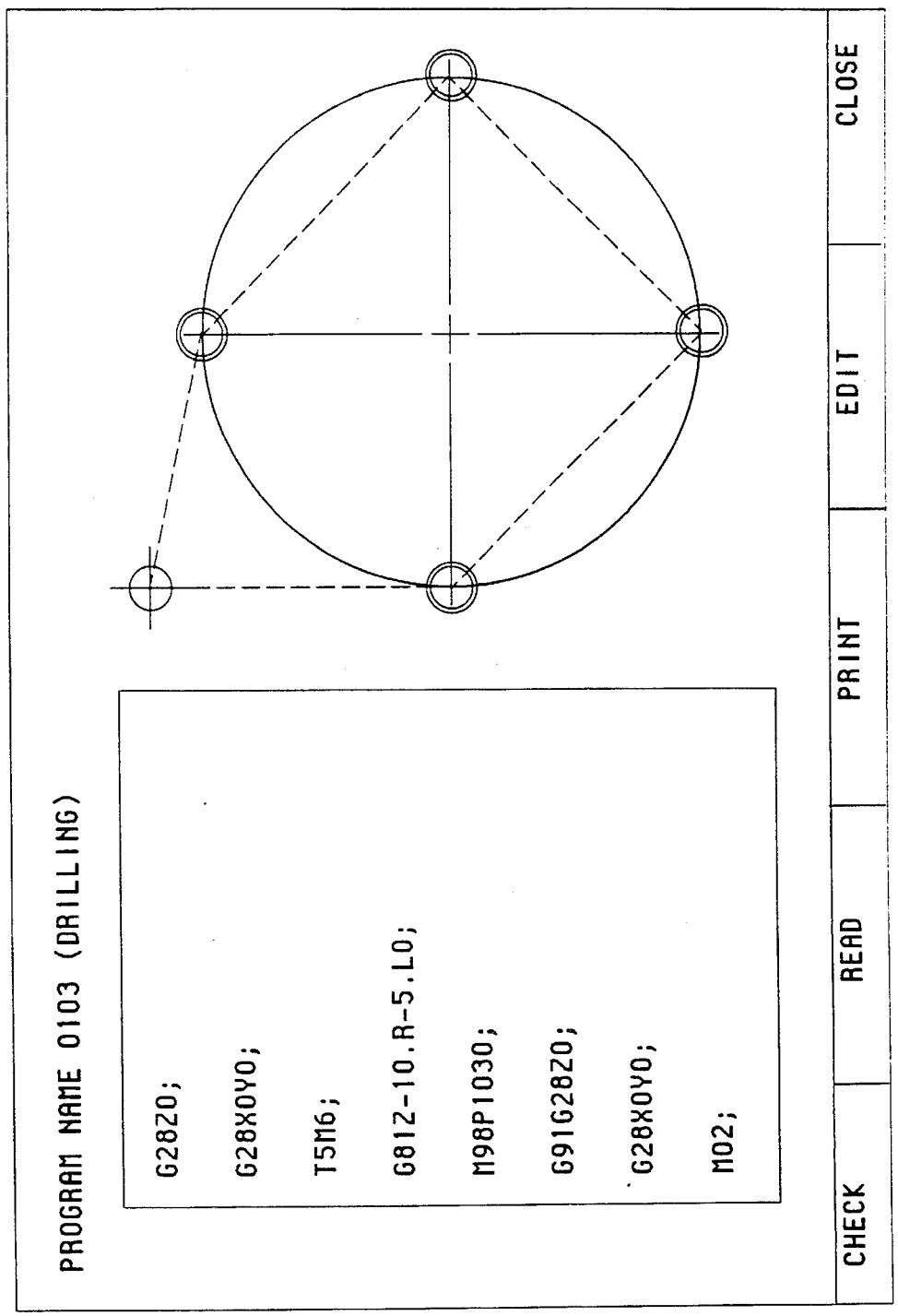
FIG. 12 illustrates an "O103(DRILLING)" edit screen displayed on the CRT/MDI unit according to an embodiment of the present invention.

FIG. 12 illustrates the details of "O0103(DRILLING)." Pressing a key associated with "CHECK" on this screen allows the plotting of an "O103(DRILLING)" program to be checked. Pressing a key corresponding to "READ" allows the machining program to be entered from an external input device. Pressing a key corresponding to "PRINT" allows the "O103(DRILLING)" program to be printed out on an external printer. Pressing a key associated with "EDIT" allows the "O103(DRILLING)" program to be edited. Pressing the key corresponding to "CLOSE" returns to the screen in FIG. 9.

Processing will now be described.

Figure 13:
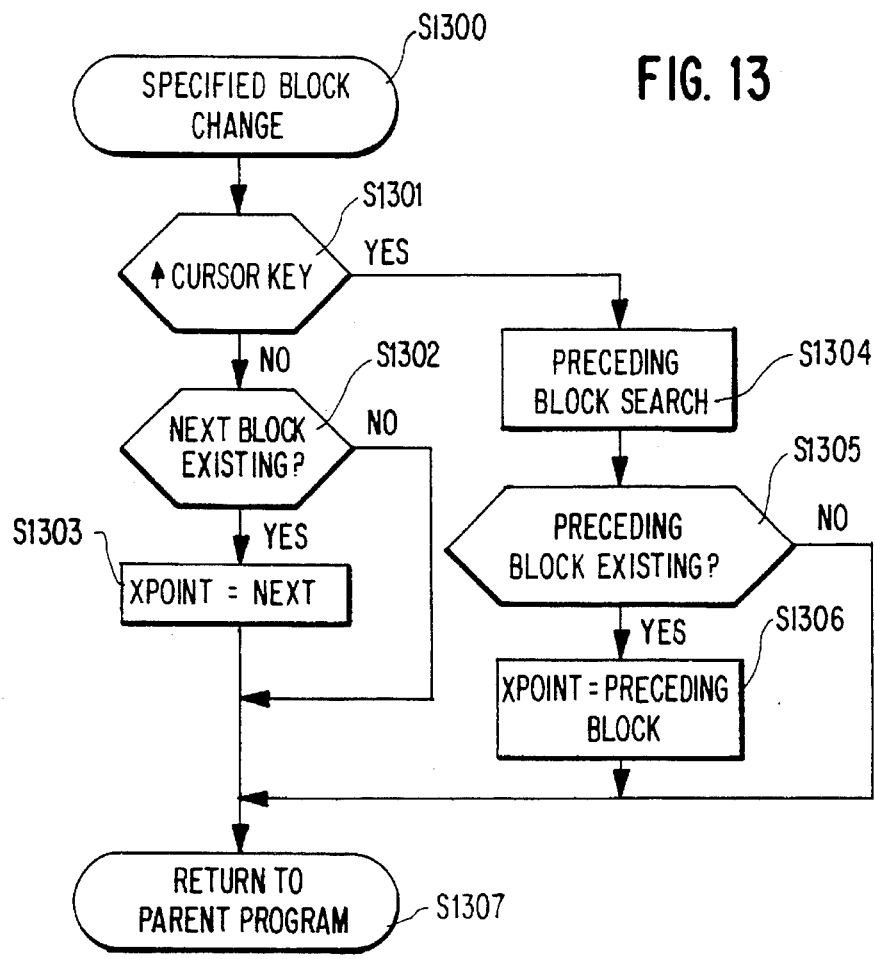
FIG. 13 is a specified block change processing flowchart according to an embodiment of the present invention.

FIG. 13 is a flowchart of "specified block change" processing called when an up cursor key (↑) or a down cursor key (↓) is pressed on the schedule block display screen, beginning with START step 1300.

Step 1301: A check is made to see if the key pressed is the up cursor key or not. If it is the up cursor key, the processing branches to step 1304 and moves the specified block one position backward.

Step 1302: A check is made to see if there is a next block or not. There is a next block if the "next" of this schedule block is not 0. When there is no next block, the processing branches to step 1307 since there is nothing to be done.

Step 1303: The address "next" of the next block is assigned to a pointer global variable "xpoint" indicating the address of the specified block, thereby using the next block as the specified block. The processing then returns to the parent program at step 1307.

Step 1304: Since the up cursor key has been pressed, it is desired to employ a block preceding the current specified block as the specified block. Hence, the preceding block is searched for. A block of which "next" matches the current "xpoint" is the preceding block.

Step 1305: If the preceding block does not exist, the processing branches to step 1307 because there is nothing to be done.

Step 1306: The address of the preceding block is assigned to "xpoint", thereby employing the preceding block as the specified block.

Step 1307: The processing returns to the parent program.

Figure 14:
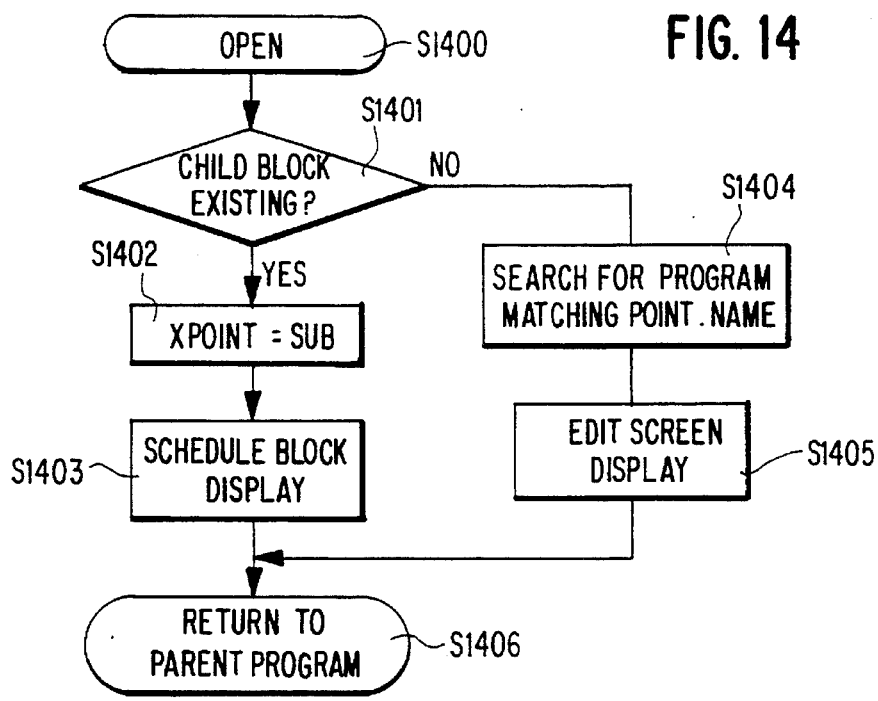
FIG. 14 is an open processing flowchart according to an embodiment of the present invention.

FIG. 14 is a flowchart of "open" processing called when the key corresponding to "OPEN" is pressed on the schedule block display screen.

Step 1401: A check is made to see if there is a child block in the specified block. The child block exists if "sub" of the specified block is not 0. If there is no child block, the processing branches to step 1404 and transits to an edit screen.

Step 1402: Since there is a child block, "sub" is assigned to the pointer global variable "xpoint" indicating the address of the specified block, thereby using the child block as the specified block.

Step 1403: The schedule block is displayed. The process then returns to the parent block at step 1406.

Step 1404: Since there is no child block, the program having the program name (name) of the specified block is searched for to move to the edit screen.

Step 1405: The edit screen is displayed.

Step 1406: The processing returns to the parent program.

Figure 15:
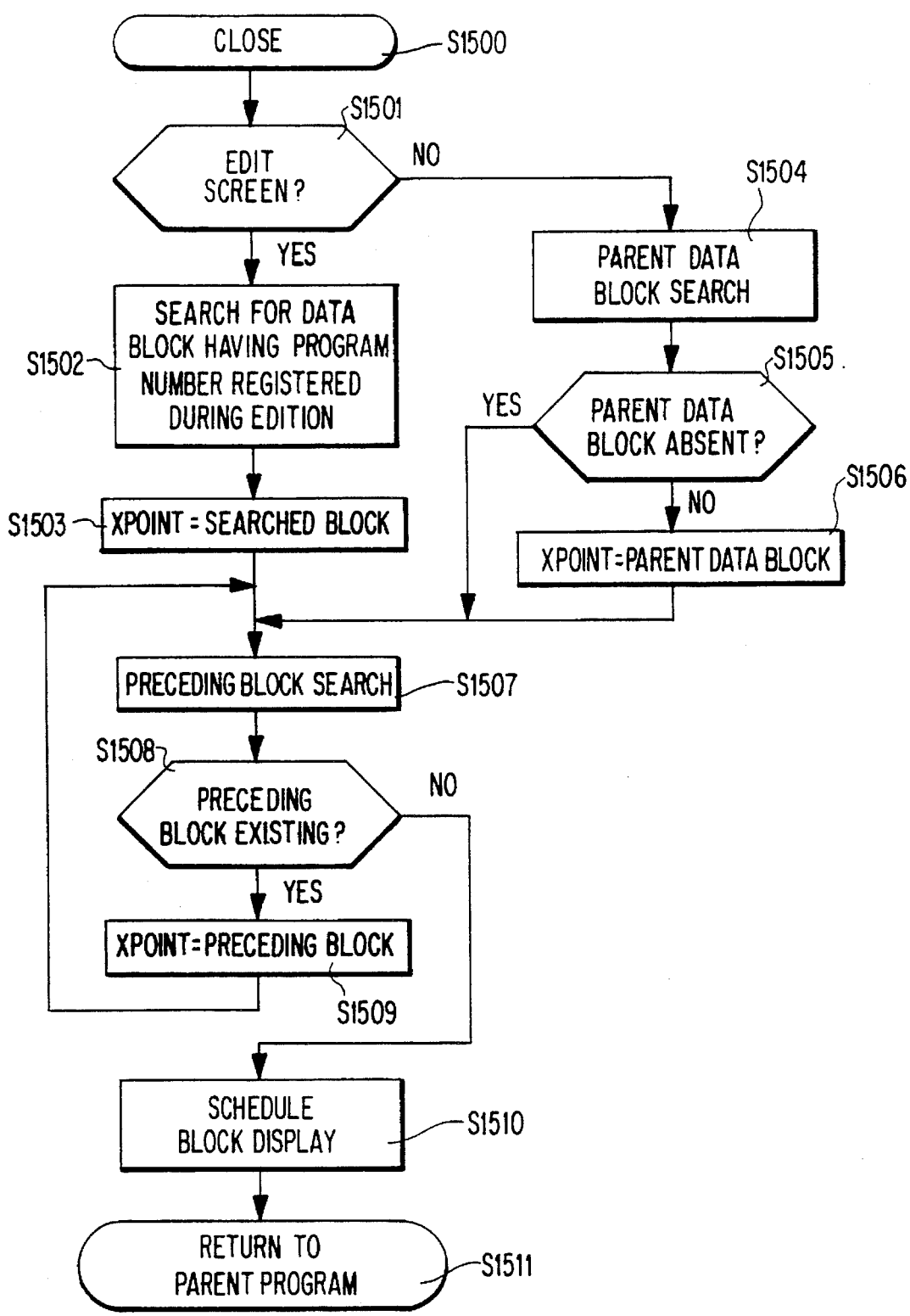
FIG. 15 is a close processing flowchart according to an embodiment of the present invention.
Figure 16:
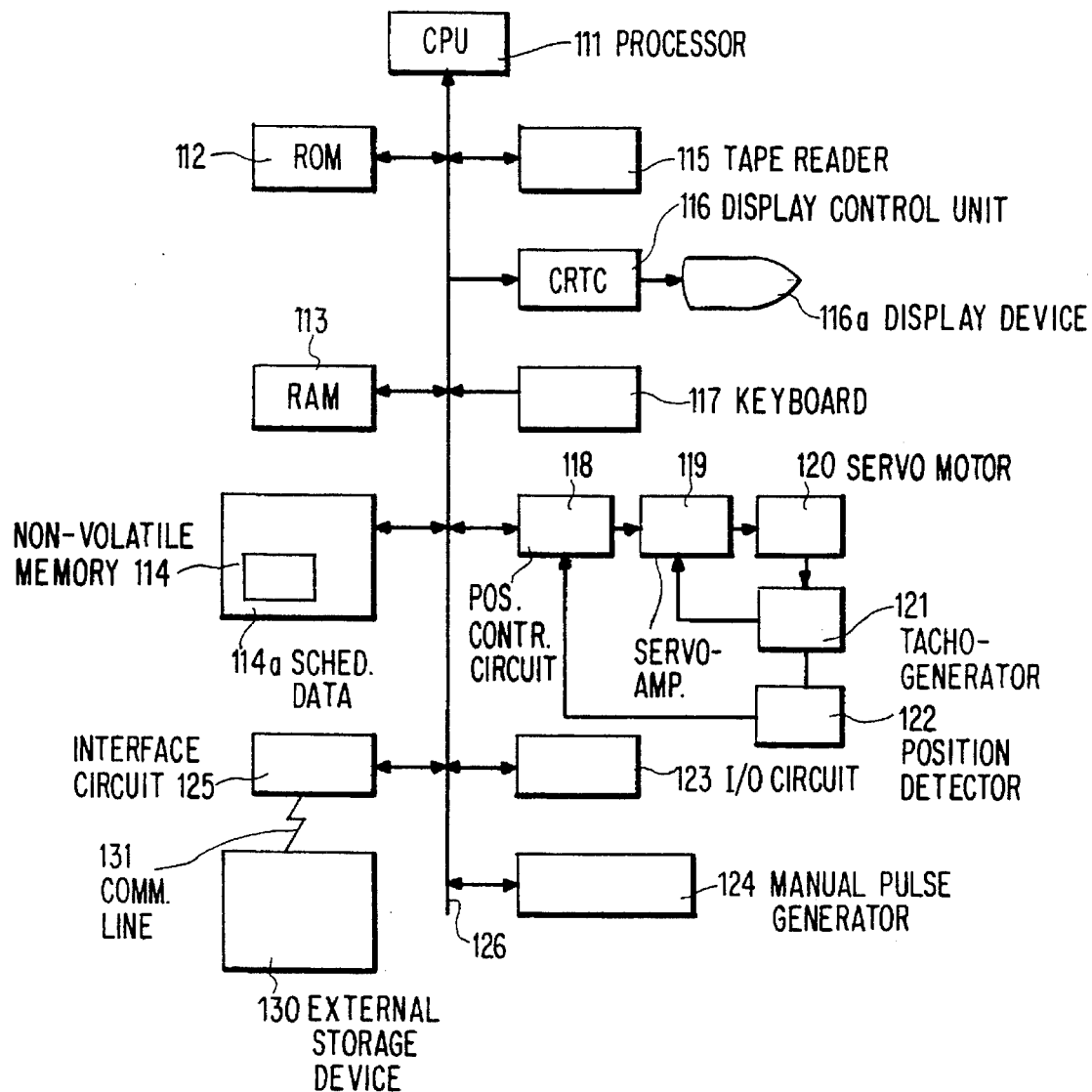
FIG. 16 is a hardware configuration diagram of a numerical control unit known in the art.
Figure 17:
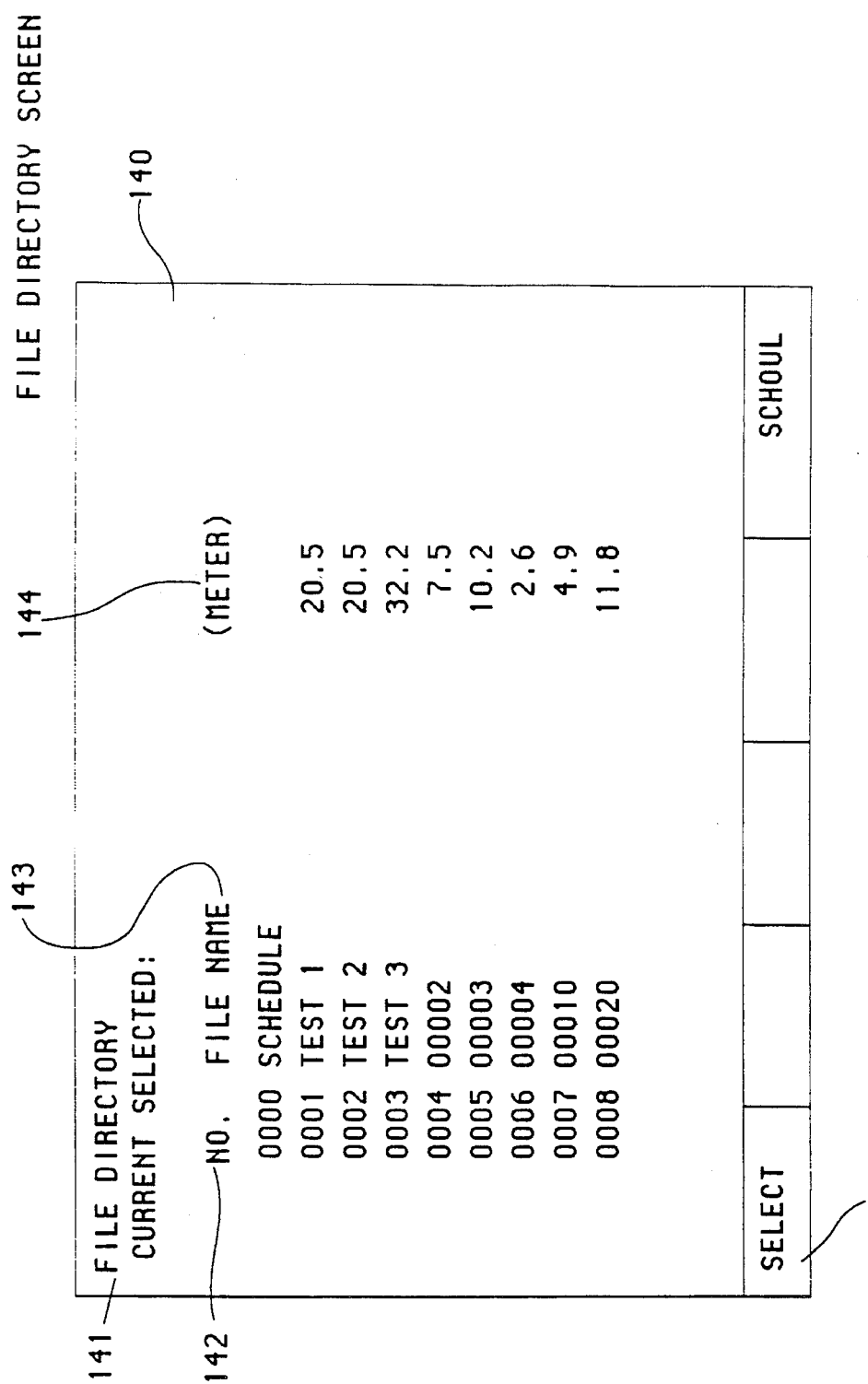
FIG. 17 provides an example of a machining program file directory screen of the known numerical control unit.

FIG. 15 is a flowchart of "close" processing called when the key corresponding to "CLOSE" is pressed on the edit screen or the schedule block display screen.

Step 1501: A check is made to see if the edit screen is being displayed or not. If the screen being displayed is not the edit screen (is the schedule block display screen), the processing branches to step 1504.

Step 1502: The schedule block wherein the program being displayed on the edit screen is registered is searched for. The block searched for is the one having the "name" matching the program name on the edit screen.

Step 1503: The address of the block found is assigned to the pointer global variable "xpoint" indicating the address of the specified block, thereby using it as the specified block. The processing then progresses to step 1507.

Step 1504: A parent data block is searched for since "CLOSE" has been selected on the schedule block display screen. Blocks before the specified block are searched for a block whose "sub" is the address of the first block. This is the parent block.

Step 1505: When there is no parent data block, the processing branches to step 1507 since there is nothing to be done.

Step 1506: The address of the parent data block is assigned to "xpoint," thereby using the parent data block as the specified block.

Step 1507: A block preceding the specified block is searched for. The schedule block of which "next" matches "xpoint" is the preceding block.

Step 1508: If the preceding block is absent, it indicates that the specified block is the first block and therefore the processing branches to step 1510 and displays the schedule block.

Step 1509: The address of the preceding block is assigned to "xpoint" to employ the preceding block as the specified block. To search for the first block, the processing branches to the step 1507 and repeats the following steps.

Step 1510: Schedule blocks are displayed, beginning with the specified schedule block indicated by "xpoint."

Step 1511: The processing returns to the parent program.

According to the present invention, as described above, the schedule skipping means for skipping a schedule at the occurrence of an alarm allows machining to be continued without stopping a schedule run if an alarm occurs during the run.

The memory for storing a measurement schedule corresponding to a machining schedule allows any measurement schedule to be made out, ensuring the implementation of the measurement schedule which will not impair productivity greatly.

The memory capable of registering two or more schedule elements as one group allows a complicated schedule, such as the repeated machining of multiple sets of workpiece machining, to be made out easily with a small-capacity memory.

The clock and the memory for storing run start time corresponding to a schedule allow run start time of day and run interval time to be set, ensuring ease of control such as an unattended warming-up run and an interval run including machine cooling time.

The machining schedule specifying means, the schedule display-to-edit transition means and the edit-to-schedule display transition means allow any of schedule data displayed on a schedule registration display screen to be specified and edited and an edit screen for a machining program to be directly transited to a corresponding schedule display screen to check the schedule status of that program, ensuring ease of operation as well as preventing incorrect program edition from being made by writing and/or entering a wrong program number.

What is claimed is:

1. A numerical control unit for performing numerical control processing in accordance with a schedule run defined by a machining command program, and for driving a machine tool according to the results of such processing for machining workpieces as commanded, comprising:

a memory for storing first and second types of machining schedules, in sequential order, each of said machining schedules comprising data identifying the machining schedule next in sequence, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, means for indicating whether a skip condition has occurred, and means for causing said machining command program to access a specified machining schedule in said sequence of machining schedules when said indicating means indicates that a skip condition has occurred.

2. A numerical control unit as defined in claim 1, wherein said causing means causes said machining command program to skip from a machine schedule currently being accessed to access a machining schedule next in said sequence.

3. A numerical control unit as defined in claim 1, wherein said specified machining schedule comprises tool change command data.

4. A numerical control unit as defined in claim 1, wherein said specified machining schedule comprises workpiece change command data.

5. A numerical control unit as defined in claim 1, wherein said specified machining schedule data comprises pallet change command data.

6. A numerical control unit as defined in claim 1, wherein said skip condition identifies said specified machining schedule.

7. A numerical control unit for performing numerical control processing in accordance with a machining command program and driving a machine tool according to processing results for machining a workpiece as commanded, comprising:

a memory for storing first and second types of machining schedules, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, a memory for storing measurement schedules associated with the machining schedules, and schedule skipping means for skipping at least from one of said machining schedules being executed to one of said measurement schedules.

8. A numerical control unit for performing numerical control processing in accordance with a machining command program and driving a machine tool according to processing results for machining workpieces as commanded, comprising:

a memory for storing, in a sequence, first groups of at least two machining schedule elements for accessing by said machining command program in said sequence to control driving of said machine tool, one of said machining schedule elements in each said first group identifying the group next in said sequence, and for storing second groups, each of said second groups including data which identifies one of said first groups and which, when accessed by said machining command program, instructs said machining command program to access said control data in said one of said first groups to control said machine tool instead of instructing said machining command program to access data in said assessed second group to control said machine tool, and means for causing said machining command program to skip from a group being accessed thereby to access a specified group in said sequence.

9. A numerical control unit for performing numerical control processing in accordance with a machining command program and driving a machine tool according to processing results for machining workpieces as commanded, comprising:

a memory for storing first and second types of machining schedules, in sequential order, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, each of said machining schedules comprising data identifying the machining schedule next in sequence, and for storing run start data indicating a run start time of day at which said machining command program is to begin running, a clock for counting a cycle signal and updating time of day, and means for reading the time of day from said clock and signaling said machining command program to begin running when the time of day is past the run start time of day.

10. A numerical control unit as defined in claim 9, wherein the run start data identifies an incremental time from a certain reference time of day.

11. A method of performing numerical control processing in accordance with a machine command program that is operative to execute a plurality of ordered commands as a schedule run and to generate processing results, and for driving a machine tool according to the processing results for machining a workpiece as commanded, comprising the steps of:

storing a plurality of machining schedules in a sequential order for accessing by said machine command program in said sequential order, each of said machining schedules comprising data identifying the next machine schedule in sequence, accessing at least some of said first machining schedules in said sequential order to control driving of said machine tool, configuring said machining schedules as first and second types of machining schedules, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, stopping accessing of said machining schedule being accessed when an alarm occurs, and accessing a specified machine schedule in said sequence in accordance with said alarm.

12. The method of performing numerical control processing as defined in claim 11, wherein said specified machining schedule comprises tool change command data.

13. The method of performing numerical control processing as defined in claim 11, wherein said specified machining schedule comprises workpiece change command data.

14. The method of performing numerical control processing as defined in claim 11, wherein said specified machining schedule comprises pallet change command data.

15. The method of performing numerical control processing as defined in claim 11, further comprising the steps of:

storing a measurement schedule corresponding to one of said machining schedules, and causing said machining command program to access said measurement schedule to measure said workpiece being machined.

16. The method of performing numerical control processing as set forth in claim 11, further comprising the steps of:

storing run start data indicating a run start time of day at which said machine command program is to begin running, determining a current time of day and generating time data in accordance therewith, comparing said time data with said stored run start data, and signaling said machine command program to begin running when said comparing step indicates that the time of day has passed run start time of day.

17. The method of performing numerical control processing as set forth in claim 16, wherein said run start data represents a time increment referenced from a particular time of day.

18. The method of performing numerical control processing as set forth in claim 17, wherein said particular time of day is the preceding machining end time of day.

19. The method of performing numerical control processing as set forth in claim 14, further comprising the steps of:

displaying groups of information representing at least one of said machining schedules;

selecting one said group of information;

modifying data of said machining schedule represented by said selected group; and re-displaying said groups of information.

20. A numerical control unit for performing numerical control processing in accordance with a machining command program and driving a machine tool according to processing results for machining a workpiece as commanded, comprising:

a memory for storing first and second types of machining schedules, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, a memory for storing measurement schedules associated with at least some of said machining schedules, said at least some of said machining schedules comprising data identifying the measurement schedule associated therewith, and schedule skipping means for causing said machining command program to skip from one of said machining schedules being accessed thereby to access the measurement schedule associated with that machining schedule to measure said workpiece in accordance therewith.

21. A method of performing numerical control processing in accordance with a machine command program that is operative to execute a plurality of ordered commands as a schedule run and to generate processing results, and for driving a machine tool according to the processing results for machining a workpiece as commanded, comprising the steps of:

storing a measurement schedule corresponding to one of a plurality of machining schedules, stopping a current machining in accordance with said schedule run when an alarm occurs, configuring said machining schedules as first and second types of machining schedules, said first type of machining schedule including control data which is accessed by said machining command program to control driving of the machine tool, said second type of machining schedule including data which identifies one of said first type of machining schedules including said control data and which, when accessed by said machining command program, instructs said machining command program to access said control data in said one of said first type of machining schedules to control said machine tool instead of instructing said machining command program to access data in said second type of machining schedule to control said machine tool, skipping out of said schedule run in order to service said alarm, skipping to said measurement schedule to measure said workpiece being machined, and resuming said schedule run.

* * * * *